(12) United States Patent
Chen et al.

(10) Patent No.: US 8,843,583 B2
(45) Date of Patent: Sep. 23, 2014

(54) METHOD AND SYSTEM FOR ALLOWING A CLIENT DEVICE TO RECEIVE SERVICE WHEN AN IP MULTIMEDIA GATEWAY DOES NOT POSSESS A CAPABILITY TO PROVIDE THE SERVICE

(75) Inventors: Xuemin Chen, Rancho Santa Fe, CA (US); Gordon Yong Li, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 680 days.

(21) Appl. No.: 12/828,549

(22) Filed: Jul. 1, 2010

(65) Prior Publication Data

US 2012/0005302 A1    Jan. 5, 2012

(51) Int. Cl.
*G06F 15/16* (2006.01)
*H04L 29/06* (2006.01)

(52) U.S. Cl.
CPC ......... *H04L 65/1036* (2013.01); *H04L 65/1016* (2013.01)
USPC ........................................................ 709/217

(58) Field of Classification Search
CPC .. H01L 65/1036; H01L 67/34; H01L 65/1016
USPC ........................................................... 709/217
See application file for complete search history.

(56) References Cited

U.S. PATENT DOCUMENTS

2008/0168523 A1 * 7/2008 Ansari et al. ............... 725/131
2010/0306074 A1 * 12/2010 Channabasavaiah et al. .. 705/26

* cited by examiner

*Primary Examiner* — Hee Soo Kim
(74) *Attorney, Agent, or Firm* — Foley & Lardner LLP; Christopher J. McKenna; Paul M. H. Pua

(57) ABSTRACT

An IP multimedia gateway (IMG) may be operable to identify a client device for which the IMG may not currently possess a capability to provide a particular service. The IMG may notify the client device that the IMG may not currently possess the capability to provide the particular service. The client device may be allowed to download and/or acquire information associated with the particular service. The client device may be allowed to receive the particular service based on the downloaded and/or acquired information. The client device may be local to the IMG and/or located remotely with respect to the IMG. The client device may be allowed to download stored content for the particular service when the IMG does not currently have an available channel or a channel of sufficient available bandwidth. The client device may be allowed to download an application to enable receiving of the particular service.

21 Claims, 5 Drawing Sheets

METHOD AND SYSTEM FOR ALLOWING A
CLIENT DEVICE TO RECEIVE SERVICE
WHEN AN IP MULTIMEDIA GATEWAY DOES
NOT POSSESS A CAPABILITY TO PROVIDE
THE SERVICE

CROSS-REFERENCE TO RELATED
APPLICATIONS/INCORPORATION BY
REFERENCE

This application makes reference to:
U.S. patent application Ser. No. 12/829,145 filed on Jul. 1, 2010;
U.S. patent application Ser. No. 12/829,179 filed on Jul. 1, 2010;
U.S. patent application Ser. No. 12/829,212 filed on Jul. 1, 2010; and
U.S. patent application Ser. No. 12/828,652 filed on Jul. 1, 2010.

Each of the above stated applications is hereby incorporated herein by reference in its entirety.

FIELD OF THE INVENTION

Certain embodiments of the invention relate to communication systems. More specifically, certain embodiments of the invention relate to a method and system for allowing a client device to receive service when an IP multimedia gateway does not possess a capability to provide the service.

BACKGROUND OF THE INVENTION

Telecommunication technologies have evolved from analog to digital technologies, and continue to evolve from circuit switched to packet switched, from connection oriented packet switching to connectionless packet switching, and from narrow band applications to broadband applications. The accompanied evolution in telecommunication technologies has significantly advanced operators' capability to offer broadband, IP-based multimedia services ranging from entertainment and lifestyle applications such as mobile TV and mobile payment to professional services such as video conferencing and real-time data exchange.

IP multimedia subsystem (IMS) defines an architectural framework for the deployment of IP multimedia services. IMS defines how these services connect and communicate with the underlying telecommunications network(s) and how they integrate with the network provider's back-end systems. IMS combines voice and data in one packet switched network such as, for example, the GPRS core network and the LTE core network, to offer network controlled multimedia services. Various Internet Protocols (IPs) such as the Session Initiation Protocol (SIP), the User Datagram Protocol (UDP), the Transmission Control Protocol (TCP) and Real-Time Transport Protocol (RTP) are widely utilized for delivery of various forms of multimedia applications over IP networks. SIP is an end-to-end application layer signaling protocol that is utilized to setup, modify, and teardown multimedia sessions such as audio/videoconferencing, interactive gaming, virtual reality, and call forwarding over IP networks. UDP and TCP are transport layer protocols that are used for data delivery over IP networks. TCP guarantees data delivery and integrity, however, UDP does not exclusively guarantee delivery of data. RTP is the Internet protocol which transmits real-time data such as audio and video data. RTP does not exclusively guarantee real-time delivery of data, but it does provide mechanisms for the sending and receiving applications to support streaming data.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for allowing a client device to receive service when an IP multimedia gateway does not possess a capability to provide the service are disclosed, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for allowing a client device to receive service when an IP multimedia gateway does not possess a capability to provide the service. In various embodiments of the invention, an IP multimedia gateway (IMG) may be operable to identify a client device for which the IMG may not currently possess a capability to provide a particular service to the client device. The IMG may be operable to notify the client device that the IMG may not currently possess the capability to provide the particular service to the client device. The client device may be allowed by the IMG to download and/or acquire information that is associated with the particular service that will enable the client device to receive the particular service. The client device may be allowed to receive the particular service based on the downloaded and/or acquired information. In this regard, the client device may be, for example, local to the IMG, and/or remote with respect to the IMG. The information may be downloaded and/or acquired from the IMG and/or from a device that is located remotely from the IMG.

In an exemplary embodiment of the invention, the IMG may be operable to notify the client device that the IMG may not currently have an available channel to provide the particular service in real-time to the client device. In this instance, for example, the IMG may be operable to cache and/or store content for the particular service, which may be received from a service manager, in the IMG. The content may be stored within the IMG and/or stored in a location that is located remotely from the IMG. The client device may be allowed by the IMG to perform the download of the stored content for the particular service from the IMG to the client device.

In another exemplary embodiment of the invention, the IMG may be operable to notify the client device that the IMG may not currently comprise a service capability which is compatible with a service capability of the client device for providing the particular service to the client device. In this instance, for example, the IMG may be operable to allow the client device to download or acquire an application, applet, or program which may enable the client device to receive the particular service. In this regard, the client device may configure itself utilizing the downloaded application to enable receiving of the particular service. In an exemplary embodiment of the invention, the client device may download or acquire the application, applet, or program from the IMG to the client device. In another exemplary embodiment of the invention, the client device may download or acquire the application, applet, or program from an application server to the client device.

Figure 1:
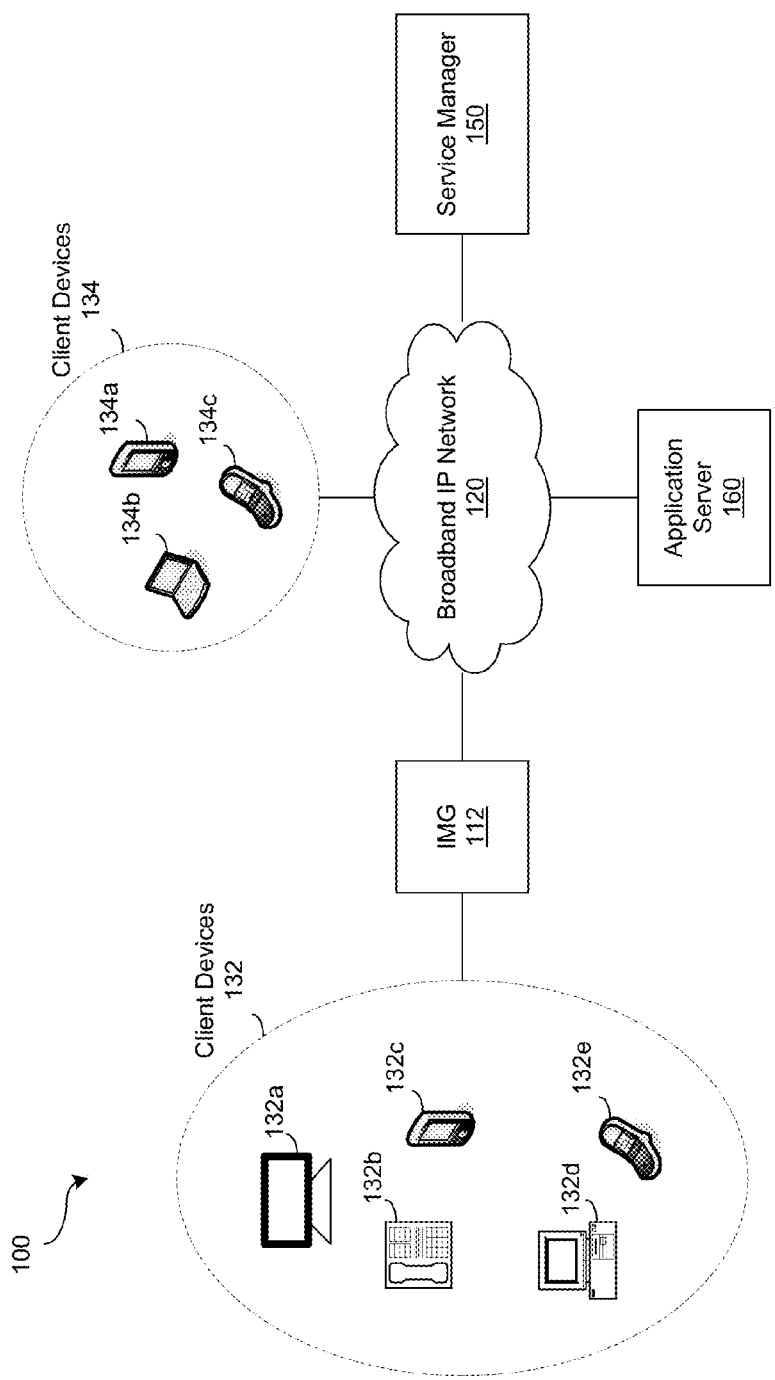
FIG. 1 is a block diagram illustrating an exemplary communication system that is operable to allow a client device to receive service when an IP multimedia gateway does not possess a capability to provide the service, in accordance with an embodiment of the invention.

FIG. 1 is a block diagram illustrating an exemplary communication system that is operable to allow a client device to receive service when an IP multimedia gateway does not possess a capability to provide the service, in accordance with an embodiment of the invention. Referring to FIG. 1, there is shown a communication system 100. The communication system 100 may comprise an IP multimedia gateway (IMG) 112, a broadband IP network 120, a plurality of client devices 132a-132e, 134a-134c, which are collectively referred to herein as client devices 132 and 134 respectively, a service manager 150 and an application server 160.

The IMG 112 may comprise suitable logic, circuitry, interfaces and/or code that may be operable to connect the client devices 132 to the broadband IP network 120 for services of interest. A service may be described or represented by the service type and the service class. The type of a service refers to as the type of information to be transferred such as data, voice, text or video for the service. A service with a given service type may be classified into a plurality of exemplary scheduling service classes, namely, data services for Internet access and messaging, conversational services for carrier-grade voice and/or video calls and conferences, video services for TV, video and music streaming, gaming services for users to interact with one another via a central server, and corporate VPN services for access to enterprise intranet/email. Specific requirements may be placed on access networks of the client devices 132 and the broadband IP network 120 for each service type and/or class to ensure desired end-to-end quality of service (QoS). The service requirements on access networks of the client devices 132 and the broadband IP network 120 may comprise, for example, system timing, CODEC, transmission rates, power-saving mechanisms, security profiles and content types.

The IMG 112 may be, for example, an IP multimedia residential gateway (IMRG) which may be located at a residential location. The IMG 112 may be located in non-residential location comprising, for example, a commercial building, an office, an office complex, an apartment building and/or a factory.

In various exemplary embodiments of the invention, the IMG 112 may be operable to integrate local client devices as well as remote client devices to the broadband IP network 120. Client devices such as the client devices 132a-132e that may access the IMG 112 via device-dependent interfaces are referred to as local client devices for the IMG 112. A device-dependent interface may generally represent the PHY and MAC functionality of a particular access technology such as, for example, Ethernet, Wi-Fi, Bluetooth, cordless, and/or Femtocell. Client devices such as the client devices 134a-134c that may access the IMG 112 remotely via device-independent interfaces such as the broadband IP network 120 are referred to as remote client devices for the IMG 112.

In an exemplary embodiment of the invention, the IMG 112 may be operable to identify a client device such as the client device 132a for which the IMG 112 may not currently possess a capability to provide a particular service to the client device. The IMG 112 may be operable to notify the client device 132a that the IMG 112 may not currently possess the capability to provide the particular service. The client device 132a may be allowed by the IMG 112 to perform a download associated with the particular service. The client device 132a may be allowed to receive the particular service based on information that may be acquired and/or downloaded by the client device 132a. In this regard, for example, the client device such as the client device 132a may be local to the IMG 112. The client device such as the client device 134a may be located remotely with respect to the IMG 112. In an embodiment of the invention, acquiring of the information may comprise broadcasting a message to one or more service managers inquiring whether one or more of the service managers may possess the information. If a particular one of the service managers such as the service manager 150 may possess the information, then the service manager 150 may be requested to communicate the information to the client device 132a via the IMG 112.

A client device such as the client device 132a may comprise suitable logic, circuitry, interfaces and/or code that may be operable to receive services from the service manager 150 via the broadband IP network 120 and the IMG 112. In various exemplary embodiments of the invention, the client device 132a may be operable to utilize an access technology specific interface such as Bluetooth, LTE, WiFi and/or Ethernet to communicate with the IMG 112 for services offered by the service manager 150 via the broadband IP network 120. The client device 132a may also be operable to communicate or exchange information with other client devices registered to the IMG 112. In this regard, the client device 132a may share information with local client devices such as client devices 132b-132e as well as remote client devices such as the client devices 134a-134c. The client device 132a may be dynamically configured to receive services via the broadband IP network 120 as well as networked client devices such as the client device 132e.

The service manager 150 may comprise suitable logic, circuitry, interfaces and/or code that may be operable to provide IP-based services to the client devices 132, 134 via the broadband IP network 120 and the IMG 112. In this regard, the server provider 150 may be configured to deliver carrier-grade as well as non-carrier-grade broadband access services to the client devices 132, 134. The server provider 150 may be operable to schedule delivery of carrier-grade services to ensure service integrity. Non-carrier-grade services may be delivered when needed without reliability and stability ensured, for example.

The broadband IP network 120 may comprise suitable logic, circuitry, communication devices, interfaces and/or code that may be operable to provide broadband communication via various wired and/or wireless technologies such as, for example, T1/E1, DSL, cable modem, FTTx, PLC and/or WiMAX. In an exemplary embodiment of the invention, the broadband IP network 120 may be operable to provide communication between the service manager 150 and the IMG 112.

The application server 160 may comprise suitable logic, circuitry, communication devices, interfaces and/or code that may be operable to provide applications or software products that may be downloaded by a communication device such as the client device 132a. In an exemplary embodiment of the invention, when allowed by the IMG 112, a specific CODEC may be downloaded from the application server 160 to the client device 132a so that the client device 132a and/or the IMG 112 may be configured and enabled to receive particular video stream from the service manager 150 using the downloaded CODEC.

In operation, an IMG 112 may be operable to identify a client device such as the client device 132a for which the IMG 112 may not currently possess a capability to provide a particular service to the client device. The IMG 112 may be operable to notify the client device 312a that the IMG 112 may not possess the capability to provide the particular service. The client device 132a may be allowed by the IMG 112 to perform a download associated with the particular service. Then the client device 132a may be allowed to receive the particular service based on the download which may be performed by the client device 132. In this regard, for example, the client device such as the client device 132a may be local to the IMG 112. The client device such as the client device 134a may be remote with respect to the IMG 112.

In an exemplary embodiment of the invention, the IMG 112 may be operable to notify the client device 132a that the IMG 112 may not have an available channel or a channel of sufficient available bandwidth to provide the particular service in real-time to the client device 132a. For example, the particular service may comprise a video service or video stream such as movie content, which may be provided by a service manager such as the service manager 150. Video channels in the IMG 112 may be utilized by other client devices such as the client devices 132b-132e. The IMG 112 may not have an available video channel or a video channel of sufficient available bandwidth to provide the video service to the client device 132a. In this instance, for example, the IMG 112 may be operable to store content for the particular service, which may be received from the service manager 150, in the IMG 112. The client device 132a may be allowed by the IMG 112 to perform the download of the stored content for the particular service from the IMG 112 to the client device 132a. For example, the IMG 112 may allow the client device 132a to use a data channel of the IMG 112 to download the stored content for the particular service. In this regard, the IMG 112 may convert the service type from a streaming service or real-time service to a downloading service for providing the particular service to the client device 132a.

In another exemplary embodiment of the invention, the IMG 112 may be operable to notify the client device 132a that the IMG 112 may not comprise a service capability which is compatible with a service capability of the client device 132a for providing the particular service to the client device 132a. In this instance, for example, the IMG 112 may be operable to allow the client device 132a to perform the download of an application which may enable the client device 132a to receive the particular service. The client device 132a may configure itself utilizing the downloaded application to enable receiving of the particular service. In this regard, for example, the client device 132a may be capable of receiving a high-definition (HD) video using a particular CODEC such as, for example, an advanced video coding (AVC) CODEC. For a particular video service which may require a MPEG-2 CODEC, the IMG 112 may not be capable of providing that particular video service to the client device 132a. The IMG 112 may be operable to allow the client device 132a to perform the download of an application which is the MPEG-2 CODEC that may enable the client device 132a to receive the particular video service using the MPEG-2 CODEC.

In an exemplary embodiment of the invention, the application may be downloaded from the IMG 112 to the client device 132a. In another exemplary embodiment of the invention, the application may be downloaded from an application server such as the application server 160 to the client device 132a.

Figure 2:
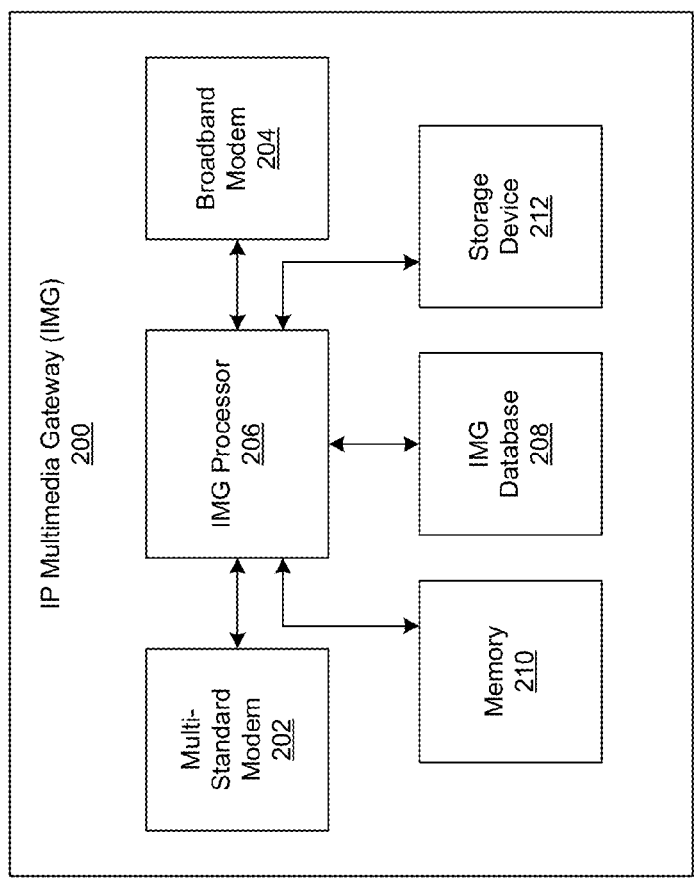
FIG. 2 is a block diagram illustrating an exemplary IP multimedia gateway (IMG) that is operable to allow a client device to receive service when the IP multimedia gateway does not possess a capability to provide the service, in accordance with an embodiment of the invention.

FIG. 2 is a block diagram illustrating an exemplary IP multimedia gateway (IMG) that is operable to allow a client device to receive service when the IP multimedia gateway does not possess a capability to provide the service, in accordance with an embodiment of the invention. Referring to FIG. 2, there is shown an IMG 200. The IMG 200 may comprise a multi-standard modem 202, a broadband modem 204, an IMG processor 206, an IMG database 208, a memory 210 and a storage device 212.

The multi-standard modem 202 may comprise suitable logic, circuitry, interfaces and/or code that may be operable to communicate with a plurality of client devices such as the client devices 132a-132e utilizing a device-dependent interface such as, for example, Ethernet, Wi-Fi, Bluetooth, cordless, and/or Femtocell.

The broadband modem 204 may comprise suitable logic, circuitry, interfaces and/or code that may be operable to transmit voice and/or data in adherence with one or more internet protocol (IP) broadband standard. The broadband modem 204 may be operable to transmit and/or receive voice and/or data to and/or from the broadband IP networks 120 over broadband connections such as, for example, T1/E1 line, DSL, Cable, FTTx, PLC and WiMAX. The broadband modem 204 may dynamically configure one or more network interfaces utilized within the broadband modem 204 towards to the broadband IP network 120. For example, in instances where the broadband modem 204 is signaled to exchange information with the VoIP softswitch network, the broadband modem 204 may be configured to utilize FTTx as an access solution to the VoIP softswitch network.

The IMG processor 206 may comprise suitable logic, circuitry, interfaces and/or code that may be operable to perform a variety of signal processing tasks to maintain or manage communication between associated client devices 132a-132e, 134a-134c and the broadband IP network 120, and/or among associated client devices 132a-132e, 134a-134c. The IMG processor 206 may be operable to perform a plurality of functions such as, for example, client device interface, client device adaptation, internal routing and control, remote access, broadband IP network adaptation and/or broadband IP network interface.

In an exemplary embodiment of the invention, the IMG processor 206 may be operable to identify a client device such as the client device 132a for which the IMG 200 may not currently possess a capability to provide a particular service to the client device 132a. The IMG processor 206 may be operable to notify the client device 312a that the IMG 200 may not currently possess the capability to provide the particular service. The client device 132a may be allowed by the IMG processor 206 to acquire and/or download information that will enable the client device 132a to receive the particular service via the IMG 200. The client device 132a may be enabled to receive the particular service based on the acquired and/or downloaded information. In this regard, for example, the client device such as the client device 132a may be local to the IMG 200. The client device such as the client device 134a may be remotely located with respect to the location of the IMG 200.

In an exemplary embodiment of the invention, the IMG processor 206 may be operable to notify the client device 132a that the IMG 200 may not have an available channel or a channel of sufficient available bandwidth to provide the particular service in real-time to the client device 132a. For example, the particular service may comprise a video service or video stream such as movie content, which may be provided by a service manager such as the service manager 150. Video channels in the IMG 200 may be utilized by other client devices such as the client devices 132b-132e. The IMG 200 may not have an available video channel or a video channel of sufficient available bandwidth to provide the video service to the client device 132a. In such an instance, for example, the IMG processor 206 may be operable to store content for the particular service, which may be received from the service manager 150, in the storage device 212 in the IMG 200. The client device 132a may be allowed by the IMG processor 206 to perform the download of the stored content for the particular service from the storage device 212 to the client device 132a. For example, the IMG processor 206 may allow the client device 132a to use a data channel of the IMG 200 to download the stored content for the particular service. In this regard, the IMG processor 206 may convert the service type from a streaming service or real-time service to a downloading service for providing the particular service to the client device 132a. In an embodiment of the invention, the content for the particular service may be stored in a location that is remote from the location of the IMG 200. For example, the content may be stored in a server or one or more other client devices such as the client device 132d that may have additional storage capacity.

In another exemplary embodiment of the invention, the IMG processor 206 may be operable to notify the client device 132a that the IMG 200 may not currently comprise a service capability which is compatible with a service capability of the client device 132a for providing the particular service to the client device 132a. In such an instance, for example, the IMG processor 206 may be operable to allow the client device 132a to perform the download of an application which may enable the client device 132a to receive the particular service. The client device 132a may configure itself utilizing the downloaded application to enable receiving of the particular service. In this regard, for example, the client device 132a may be capable of receiving a HD video using a particular CODEC such as, for example, an AVC CODEC. For a particular video service which may require a MPEG-2 CODEC, the IMG 200 may not be capable of currently providing that particular video service to the client device 132a. The IMG processor 206 may be operable to allow the client device 132a to perform the download of an application which is the MPEG-2 CODEC that may enable the client device 132a to receive the particular video service using the MPEG-2 CODEC.

In an exemplary embodiment of the invention, the application may be acquired and/or downloaded from the storage device 212 in the IMG 200 to the client device 132a. In another exemplary embodiment of the invention, the application may be downloaded from an application server such as the application server 160 to the client device 132a.

The IMG database 208 may comprise suitable logic, circuitry, interfaces and/or code that may be operable to store and manage client device information and network information. In this regard, the IMG database 208 may comprise registration status information for associated client devices such as client devices 132a-132e, 134a-134c. The registration status for a client device pertaining to the IMG 200 may be a local client device such as the client device 132a or a remote client device such as the client device 134a. The IMG database 208 may be operable to track or collect client device capabilities and network capabilities. The collected capability information may be utilized to dynamically configure client devices 132a-132e, 134a-134c pertaining to the IMG 200.

The memory 210 may comprise suitable logic, circuitry, interfaces and/or code that may be operable to store information such as executable instructions and data that may be utilized by the IMG processor 206 to perform various functions of the IMG 200. The memory 210 may comprise RAM, ROM, low latency nonvolatile memory such as flash memory and/or other suitable electronic data storage capable of storing data and instructions.

The storage device 212 may comprise suitable logic, circuitry, interfaces and/or code that may be operable to store content for service that may be received by the IMG processor 206 from a service manager such as the service manager 150 via the broadband IP network 120 and the broadband modem 204. The storage device 212 may be operable to store applications. In an exemplary embodiment of the invention, the stored content for a particular service may be downloaded to a client device such as the client device 132a so as to provide a downloading service to the client device 132a. In another exemplary embodiment of the invention, a stored application such as, for example, a particular CODEC may be downloaded to a client device such as the client device 132a. The downloaded application such as the downloaded particular CODEC may be utilized by the client device 132a so as to enable the client device 132a to receive a particular service that may be provided by the service manager 150. The storage device 212 may comprise, for example, a hard disk, a flash drive or other nonvolatile storage devices.

In operation, an IMG such as the IMG 200 may provide connections and/or interfaces for various client devices such as the client devices 132a-132e to a broadband IP network such as the broadband IP network 120. An IMG processor 206 in the IMG 200 may be operable to identify a client device such as the client device 132a for which the IMG 200 may not currently possess a capability to provide a particular service to the client device 132a. The IMG processor 206 may be operable to notify the client device 312a that the IMG 200 may not currently possess the capability to provide the particular service to the client device 132a. The client device 132a may be allowed by the IMG processor 206 to acquire and/or download information that will enable the client device 132a to receive the particular service. Then the client device 132a may be allowed to receive the particular service based on the acquired and/or downloaded information or data. In this regard, for example, the client device such as the client device 132a may be local to the IMG 200. The client device such as the client device 134a may be remote with respect to the IMG 200.

In an exemplary embodiment of the invention, the IMG processor 206 may be operable to notify the client device 132a that the IMG 200 may not have an available channel or a channel of sufficient available bandwidth to provide the particular service in real-time to the client device 132a. For example, the particular service may comprise a video service or video stream such as movie content, which may be provided by a service manager such as the service manager 150. Video channels in the IMG 200 may be utilized by other client devices such as the client devices 132b-132e. The IMG 200 may not currently have an available video channel or a video channel of sufficient available bandwidth to provide the video service to the client device 132a. In this instance, for example, the IMG processor 206 may be operable to store content for the particular service, which may be received from the service manager 150, in the storage device 212 in the IMG 200. The client device 132a may be allowed by the IMG processor 206 to acquire and/or download the stored content for the particular service from the storage device 212 to the client device 132a. For example, the IMG processor 206 may allow the client device 132a to use a particular data channel of the IMG 200 to download the stored content for the particular service. In this regard, the IMG processor 206 may convert the service type from a streaming service or real-time service to a downloading service for providing the particular service to the client device 132a.

In another exemplary embodiment of the invention, the IMG processor 206 may be operable to notify the client device 132a that the IMG 200 may not comprise a service capability which is compatible with a service capability of the client device 132a for providing the particular service to the client device 132a. In this instance, for example, the IMG processor 206 may be operable to allow the client device 132a to acquire and/or download an application comprising, an applet, code, a CODEC and/or a driver which may enable the client device 132a to receive the particular service. The client device 132a may configure itself utilizing the downloaded application to enable receiving of the particular service. In this regard, for example, the client device 132a may be capable of receiving a HD video using a particular CODEC such as, for example, an AVC CODEC. For a particular video service which may require a MPEG-2 CODEC, the IMG 200 may not be currently capable of providing that particular video service to the client device 132a. The IMG processor 206 may be operable to allow the client device 132a to acquire and/or download information or data comprising an applet and/or code which is the MPEG-2 CODEC that may enable the client device 132a to receive the particular video service using the MPEG-2 CODEC.

In an exemplary embodiment of the invention, the application may be downloaded from the storage device 212 in the IMG 200 to the client device 132a. In another exemplary embodiment of the invention, the application may be downloaded from an application server such as the application server 160 to the client device 132a.

Figure 3:
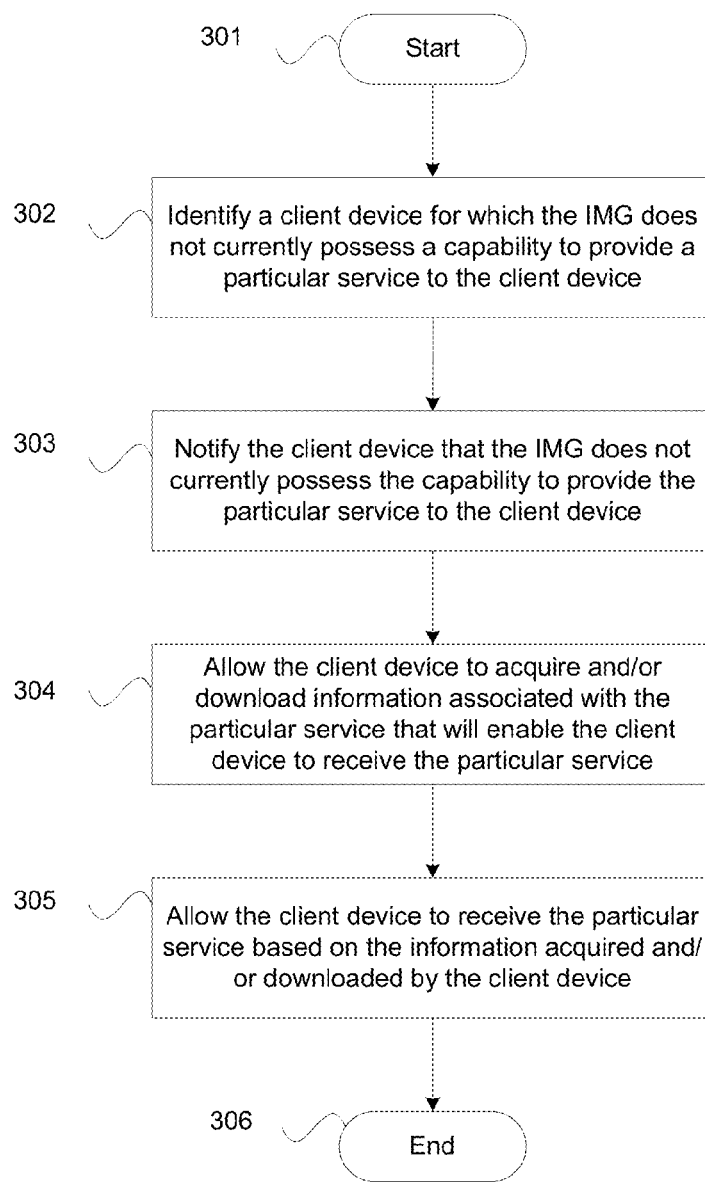
FIG. 3 is a flow chart illustrating exemplary steps for allowing a client device to receive service when an IP multimedia gateway does not possess a capability to provide the service, in accordance with an embodiment of the invention.

FIG. 3 is a flow chart illustrating exemplary steps for allowing a client device to receive service when an IP multimedia gateway does not possess a capability to provide the service, in accordance with an embodiment of the invention. Referring to FIG. 3, the exemplary steps start at step 301. In step 302, the IMG 112 may be operable to identify a client device 132a for which the IMG 112 may not currently possess a capability to provide a particular service to the client device 132a. In step 303, the IMG 112 may be operable to notify the client device 132a that the IMG 112 may not currently possess the capability to provide the particular service to the client device 132a. In step 304, the client device 132a may be allowed by the IMG 112 to acquire and/or download information associated with the particular service that will enable the client device to receive the particular service. In step 305, the client device 132a may be allowed by the IMG 112 to receive the particular service based on the information acquired and/or downloaded by the client device 132a. The exemplary steps may proceed to the end step 306.

Figure 4:
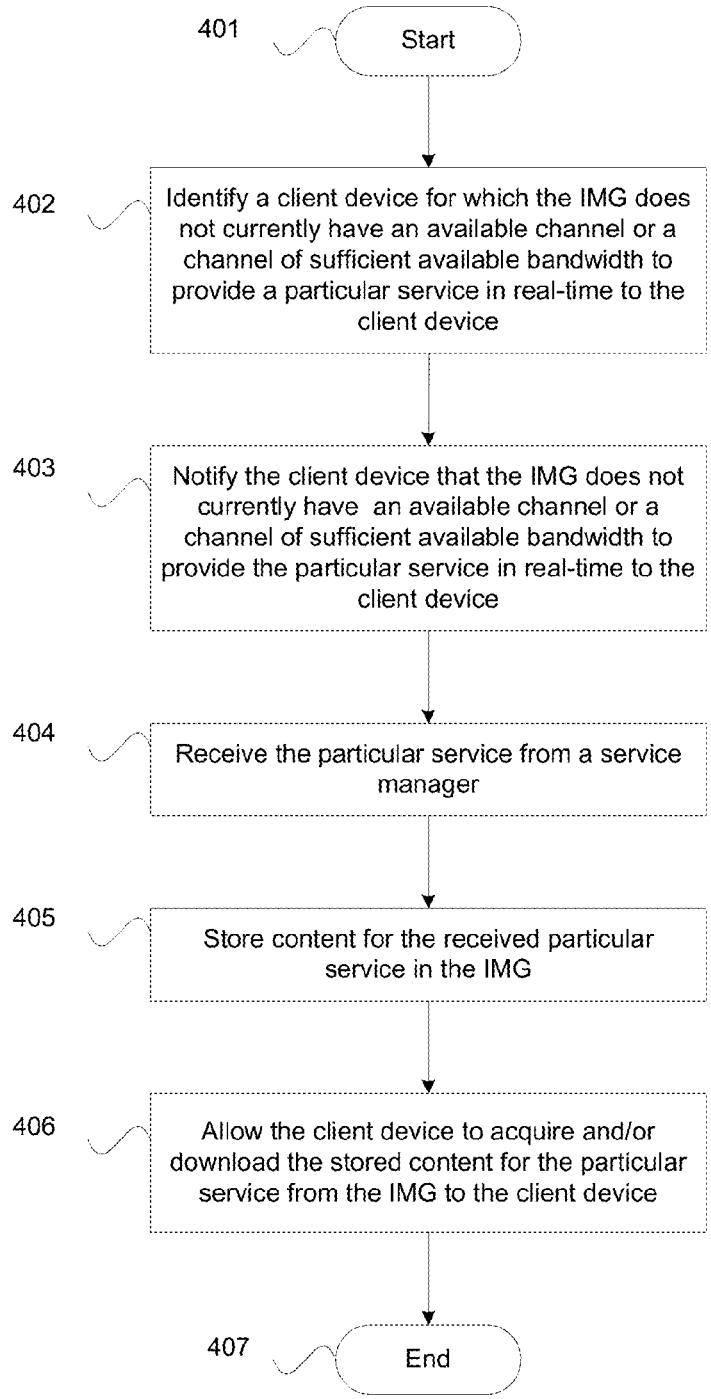
FIG. 4 is a flow chart illustrating exemplary steps for allowing a client device to acquire and/or download content for a service when an IP multimedia gateway does not have an available channel or a channel of sufficient available bandwidth to provide the service in real-time, in accordance with an embodiment of the invention.

FIG. 4 is a flow chart illustrating exemplary steps for allowing a client device to acquire and/or download content for a service when an IP multimedia gateway does not have an available channel or a channel of sufficient available bandwidth to provide the service in real-time, in accordance with an embodiment of the invention. Referring to FIG. 4, the exemplary steps start at step 401. In step 402, the IMG 112 may be operable to identify a client device 132a for which the IMG 112 may not currently have an available channel or a channel of sufficient available bandwidth to provide a particular service in real-time to the client device 132a. In step 403, the client device 132a may be notified by the IMG 112 that the IMG 112 may not currently have an available channel or a channel of sufficient available bandwidth to provide the particular service in real-time to the client device 132a. In step 404, the IMG 112 may be operable to receive the particular service from a service manager 150. In step 405, content for the received particular service may be stored in the IMG 112. In step 406, the IMG 112 may be operable to allow the client device 132a to acquire and/or download the stored content for the particular service from the IMG 112 to the client device 132a. The exemplary steps may proceed to the end step 407.

Figure 5:
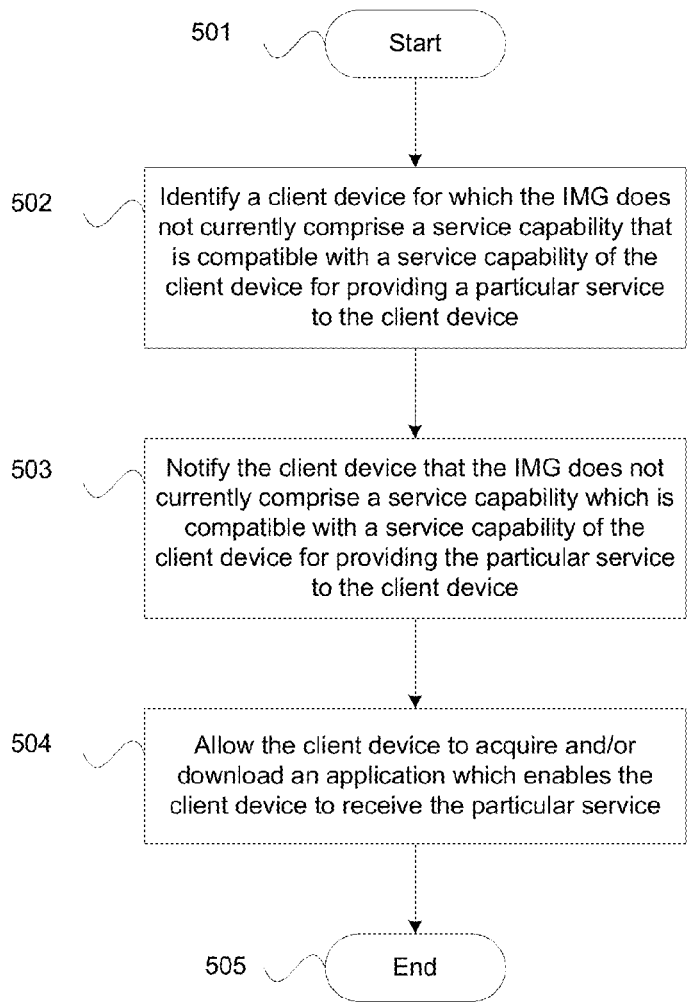
FIG. 5 is a flow chart illustrating exemplary steps for allowing a client device to acquire and/or download an application which enables the client device to receive a service when an IP multimedia gateway does not comprise a service capability that is compatible with a service capability of the client device for providing the service, in accordance with an embodiment of the invention.

FIG. 5 is a flow chart illustrating exemplary steps for allowing a client device to acquire and/or download an application which enables the client device to receive a service when an IP multimedia gateway does not currently comprise a service capability that is compatible with a service capability of the client device for providing the service, in accordance with an embodiment of the invention. Referring to FIG. 5, the exemplary steps start at step 501. In step 502, the IMG 112 may be operable to identify a client device 132a for which the IMG 112 may not currently comprise a service capability that is compatible with a service capability of the client device 132a for providing a particular service to the client device 132a. In step 503, the client device 132a may be notified by the IMG 112 that the IMG 112 may not currently comprise a service capability which is compatible with a service capability of the client device 132a for providing the particular service to the client device 132a. In step 504, the client device 132a may be allowed by the IMG 112 to acquire and/or download of an application which may enable the client device 132a to receive the particular service. The exemplary steps may proceed to the end step 505.

In various embodiments of the invention, an IMG 112 may be operable to identify a client device such as the client device 132a for which the IMG 112 may not currently possess a capability to provide a particular service to the client device 132a. The IMG 112 may be operable to notify the client device 132a that the IMG 112 may not currently possess the capability to provide the particular service to the client device 132a. The client device 132a may be allowed by the IMG 112 to download and/or acquire information that is associated with the particular service that will enable the client device 132a to receive the particular service. The client device 132a may be allowed to receive the particular service based on the downloaded and/or acquired information. In this regard, for example, the client device such as the client device 132a may be local to the IMG 112. The client device such as the client device 134a may be remote with respect to the IMG 112. The information may be downloaded and/or acquired from the IMG 112 and/or from a device that is located remotely from the IMG 112.

In an exemplary embodiment of the invention, the IMG 112 may be operable to notify the client device 132a that the IMG 112 may not currently have an available channel or a channel of sufficient available bandwidth to provide the particular service in real-time to the client device 132a. In this instance, for example, the IMG 112 may be operable to cache and/or store content for the particular service, which may be received from a service manager 150, in the IMG 112. The content may be stored within the IMG 112 and/or stored in a location that is located remotely from the IMG 112. The client device 132a may be allowed by the IMG 112 to perform the download of the stored content for the particular service from the IMG 112 to the client device 132a.

In another exemplary embodiment of the invention, the IMG 112 may be operable to notify the client device 132a that the IMG 112 may not currently comprise a service capability which is compatible with a service capability of the client device 132a for providing the particular service to the client device 132a. In this instance, for example, the IMG 112 may be operable to allow the client device 132a to download or acquire an application, applet, or program which may enable the client device 132a to receive the particular service. In this regard, the client device 132a may configure itself utilizing the downloaded application to enable receiving of the particular service. In an exemplary embodiment of the invention, the client device 132 may download or acquire the application, applet, or program from the IMG 112 to the client device 132a. In another exemplary embodiment of the invention, the client device 132a may download or acquire the application, applet, or program from an application server 160 to the client device 132a.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for allowing a client device to receive service when an IP multimedia gateway does not possess a capability to provide the service.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
in an IP multimedia gateway (IMG):
receiving a request from a client device for a particular service;
determining that the IMG does not currently possess a capability to provide the particular service to the client device;
notifying the client device that the IMG does not currently possess the capability to provide the particular service to the client device;
enabling the client device to download, from a storage device through the IMG to the client device, content associated with the particular service that will enable the particular service to be provided to the client device, wherein the IMG receives the particular service from a service manager, and stores the content for the particular service in the storage device; and
enabling the client device to receive the particular service based on the content downloaded by the client device.

2. The method according to claim 1, wherein a location of the client device is local with respect to a location of the IMG.

3. The method according to claim 1, wherein a location of the client device is remote with respect to a location of the IMG.

4. The method according to claim 1, wherein the notifying comprises notifying sai the client device that the IMG does not currently have an available channel or a channel of sufficient available bandwidth to provide the particular service in real-time to the client device.

5. The method according to claim 1, wherein the notifying comprises notifying the client device that the IMG does not currently comprise a service capability which is compatible with a service capability of the client device for currently providing the particular service to the client device.

6. The method according to claim 5, wherein the enabling the download of the content comprises allowing the client device to perform the download of an application, as the content, which enables the client device to receive the particular service.

7. The method according to claim 6, wherein the client device configures itself utilizing the downloaded application to enable receiving of the particular service.

8. The method according to claim 6, wherein the client device performs the download of the application through the IMG to the client device.

9. The method according to claim 6, wherein the client device performs the download of the application from an application server of the IMG to the client device.

10. The method according to claim 1, further comprising converting a service type of the particular service from a streaming service to a downloading service for providing the particular service to the client device.

11. A system for communication, the system comprising:
one or more processors or circuits for use in an IP multimedia gateway (IMG), wherein the one or more processors or circuits are configured to:
- receive a request from a client device for a particular service;
- determine that the IMG does not currently possess a capability to provide the particular service to the client device;
- notify the client device that the IMG does not currently possess the capability to provide the particular service to the client device;
- enable the client device to download, from a storage device through the IMG to the client device, content associated with the particular service that will enable the particular service to be provided to the client device, wherein the one or more processors or circuits are configured to receive the particular service from a service manager, and store the content for the particular service in the storage device; and
- enable the client device to receive the particular service based on the content downloaded by the client device.

12. The system according to claim 11, wherein a location of the client device is local with respect to a location of the IMG.

13. The system according to claim 11, wherein a location of the client device is remote with respect to a location of the IMG.

14. The system according to claim 11, wherein the one or more processors or circuits are configured to notify the client device that the IMG does not currently have an available channel or a channel of sufficient available bandwidth to provide the particular service in real-time to the client device.

15. The system according to claim 11, wherein the one or more processors or circuits are configured to notify the client device that the IMG does not currently comprise a service capability which is compatible with a service capability of the client device for currently providing the particular service to the client device.

16. The system according to claim 15, wherein the one or more processors or circuits are configured to allow the client device to perform the download of an application, as the content, which enables the client device to receive the particular service.

17. The system according to claim 16, wherein the client device is configured to configure itself utilizing the downloaded application to enable receiving of the particular service.

18. The system according to claim 16, wherein the client device is configured to perform the download of the application through the IMG to the client device.

19. The system according to claim 16, wherein the client device is configured to perform the download of the application from an application server of the IMG to the client device.

20. The system according to claim 11, wherein the one or more processors or circuits are configured to convert a service type of the particular service from a streaming service to a downloading service for providing the particular service to the client device.

21. A non-transitory computer readable medium having executable instructions, that when executed by a hardware processor in an IP multimedia gateway (IMG), cause the hardware processor to:
- receive a request from a client device for a particular service;
- determine that the IMG does not currently possess a capability to provide the particular service to the client device;
- notify the client device that the IMG does not currently possess the capability to provide the particular service to the client device;
- enable the client device to download, from a storage device through the IMG to the client device, content associated with the particular service that will enable the particular service to be provided to the client device, wherein the IMG receives the particular service from a service manager, and stores the content for the particular service in the storage device; and
- enable the client device to receive the particular service based on the content downloaded by the client device.

* * * * *